(12) United States Patent
Saito

(10) Patent No.: US 6,228,932 B1
(45) Date of Patent: May 8, 2001

(54) FLUORORESIN POWDER LIQUID DISPERSION CAPABLE OF FORMING THICK COATINGS

(75) Inventor: Takumi Saito, Shimizu (JP)

(73) Assignee: DuPont Mitsui Fluorochemicals, Tokyo (JP)

( * ) Notice: Subject to any disclaimer, the term of this patent is extended or adjusted under 35 U.S.C. 154(b) by 0 days.

(21) Appl. No.: 09/213,833

(22) Filed: Dec. 17, 1998

(30) Foreign Application Priority Data

Dec. 22, 1997 (JP) .................................................. 9-351871
Sep. 3, 1998 (JP) ................................................ 10-250095
Sep. 25, 1998 (JP) ................................................ 10-271977

(51) Int. Cl.[7] ............................. C08J 3/00; C08K 3/34; C08K 7/00; C08K 7/16; C08L 27/12
(52) U.S. Cl. ......................... 524/502; 523/220; 523/221; 523/223; 524/99; 524/210; 524/430; 524/432; 524/492; 524/493; 524/500; 524/544
(58) Field of Search ................ 524/99, 210, 430, 524/432, 492, 493, 500, 502, 544; 523/223, 220, 221

(56) References Cited

U.S. PATENT DOCUMENTS

| | | |
|---|---|---|
| 3,920,792 | 11/1975 | Teti et al. ............................. 428/215 |
| 4,016,125 | 4/1977 | Vassiliou et al. . |
| 4,021,395 | 5/1977 | Vary ............................... 260/29.2 R |
| 4,090,993 * | 5/1978 | Attwood et al. . |
| 5,397,831 | 3/1995 | Saito et al. ........................... 524/502 |
| 5,478,651 * | 12/1995 | Tannenbaum ...................... 428/422 |
| 5,502,097 | 3/1996 | Takumi Saito ..................... 524/389 |
| 5,922,468 * | 7/1999 | Huesmann et al. ................ 428/422 |

FOREIGN PATENT DOCUMENTS

| | | | |
|---|---|---|---|
| 300 235 A5 | 5/1992 | (DE) | ................................ C08J/3/07 |
| S57-29499 | 6/1982 | (JP) . | |
| 94/29395 | 12/1994 | (WO) | .......................... C09D/127/12 |

* cited by examiner

*Primary Examiner*—Patrick D. Niland

(57) ABSTRACT

A fluororesin powder liquid dispersion comprising heat-flowable fluororesin powder, liquid dispersion medium having a surface tension of not more than 45 dyne/cm, and colloidal particles having an average particle size of not more than 1 $\mu$m provides thick corrosion resistant coated films. Preferred colloidal particles for the dispersion are particles of polyether sulfone (PES) which are added in an aqueous dispersion containing an organic solvent and a water-miscible solvent. An aqueous dispersion of PES colloidal particles having an average particle size of not more than 1 $\mu$m is preferably prepared by (1) dissolving PES in an organic solvent capable of solubilizing PES; (2) combining the dissolved PES with a water-miscible solvent which is capable of being dissolved in the organic solvent; and (3) combining water in which there is a dissolved surfactant with the dissolved PES.

28 Claims, No Drawings

FLUORORESIN POWDER LIQUID DISPERSION CAPABLE OF FORMING THICK COATINGS

FIELD OF INVENTION

The present invention relates to fluororesin powder liquid dispersion which is suitable for coating articles, specifically to a fluororesin powder liquid dispersion which does not undergo irreversible coagulation of the liquid dispersion and can form extremely thick film coatings.

BACKGROUND OF THE INVENTION

Heat-flowable fluororesins having properties such as chemical resistance, nonstickiness, heat resistance, a low friction of coefficient and electrical insulation properties, are also capable of forming pinhole-free films and are thus useful as coating materials. Heat-flowable fluororesins used in such coating applications include, for example, copolymers of tetrafluoroethylene and perfluoro(alkyl vinyl ether) (hereinafter referred to as PFA), copolymers of tetrafluoroethylene and hexafluoropropylene (FEP), and copolymers of tetrafluoroethylene and ethylene (ETFE). These resins are insoluble in water and organic solvents, and so cannot be used as solution-type coatings. Thus, these resins are applied onto substrates by various other means, including electrostatic application of powder coating compositions or used as liquid dispersions. Liquid dispersions can be water-based and stabilized with a surfactant and or can be based on organic liquids. Liquid dispersions are applied to substrates by such means as spray-coating, dipping, or curtain-coating followed by heating and fusing to generate film coatings.

The film coatings obtained from electrostatic application of powder coating compositions generally have a thickness of about 50 to 100 $\mu$m, whereas dispersion coating compositions generally produce coated films having a thickness of 20 $\mu$m. However, this level of thickness is not sufficient for applications which require corrosion prevention, which leads to the demand for developing coating compositions capable of forming thicker film coatings.

Japanese Patent Application 57-15607 discloses a fluororesin liquid dispersion for thick-film coating application comprising a heat-flowable fluororesin powder having an average particle size of 2 to 300 $\mu$m and a void fraction of not more than 0.74 in a liquid dispersing medium having a surface tension of not more than 45 dyne/cm. This dispersion makes it possible to form thick, 500-$\mu$m coats when the surface being coated is horizontal or level, but when the surface being coated is vertical or inclined at an angle, the fluororesin powder falls off the coated surface prior to baking and film formation.

In order to form thick coats on vertical surfaces as well, U.S. Pat. No. 5,502,097 discloses a fluororesin powder liquid dispersion for thick-film coating application comprising a heat-flowable fluororesin powder having an average particle size of 5 to 300 $\mu$m and a porosity of not more than 0.74 and a total surface area of not more than 10 $m^2/cm^3$ in a liquid dispersion medium having a surface tension of not more than 45 dyne/cm, and also containing an organic liquid having a boiling point of 150 to 340° C. This invention enables a thick coat to be formed even when the surface being coated is vertical. However, because the flammability of the organic liquid in the dispersion presents a danger of explosion, this has imposed limits on the working environment.

Thus, there still remains a need, especially in applications requiring corrosion resistance, such as at chemical plants where the performance of a coating is approximately dependent on the thickness of a film, for coating compositions capable of forming thick coated films on vertical surfaces and which can be applied safely.

SUMMARY OF THE INVENTION

The present invention is related to a discovery that when colloidal particles having an average particle size of not more than 1 $\mu$m are included in a heat-flowable fluororesin powder liquid dispersion, a thick powder coating can be formed on a vertical surface which coating, prior to baking and film formation, does not fall off the substrate. These effects are further enhanced by including in the dispersion a fibrous heat-resistant filler.

Consequently, this invention provides fluororesin powder coating compositions which are capable of forming a thick coating having a thickness of 100 to 1,000 $\mu$m with excellent corrosion resistance. The coatings can form a film in a single step using a simple and convenient spray gun or the like, free of any explosion hazard.

Specifically, the fluororesin powder liquid dispersion comprises 5–50% by volume based on the liquid dispersion of heat-flowable fluororesin powder having an average particle size of 5–300 $\mu$m, a porosity of not greater than 0.74 and a total surface area of not more than 10 $m^2/cm^3$, liquid dispersion medium having a surface tension of not more than 45 dyne/cm, and colloidal particles having an average particle size of not more than 1 $\mu$m. Preferably, the colloidal particles are selected from a group consisting of inorganic oxides and organic heat resistant polymer. More preferably, the fluororesin powder liquid dispersion further comprises fibrous heat resistant filler having a length of at least 20 $\mu$m and an aspect ratio of at least 2.

Preferably, the colloidal particles in the fluororesin powder liquid dispersion are particles of polyether sulfone which are added as an aqueous dispersion comprising an organic solvent and a water-miscible solvent. An aqueous dispersion of PES colloidal particles having an average particle size of not more than 1 $\mu$m is preferably prepared by (1) dissolving PES in an organic solvent capable of solubilizing PES; (2) combining the dissolved PES with a water-miscible solvent which is capable of being dissolved in the organic solvent; and (3) combining water in which there is a dissolved surfactant with the dissolved PES and the water-miscible solvent.

DETAILED DESCRIPTION

Heat-Flowable Fluororesin

Heat-flowable fluororesins which can be used in this invention are copolymers of tetrafluoroethylene and other comonomers which melt and liquify to flow at temperatures beyond their melting points. Examples of such copolymers include copolymers of tetrafluoroethylene and perfluoro (alkyl vinyl ether) (PFA) such as perfluoro(propyl vinyl ether), copolymers of tetrafluoroethylene and hexafluoropropylene (FEP), and copolymers of tetrafluoroethylene and ethylene (ETFE). "Heat-flowable" as used herein means that the fluororesin is melt fabricable, and as such, the fluororesin particles will flow and fuse together upon heating above their melting temperature.

The average particle size of the heat-flowable fluororesin powder used in this invention is preferably in the range of 5–300 $\mu$m. If the average particle size of the heat-flowable fluororesin powder exceeds 300 $\mu$m, the coating formed is prone to pinholes. On the other hand, if the average particle size is smaller than 5 $\mu$m, when a thick film is formed, the surface of the film is prone to cracks. In addition, the heat-flowable fluororesin powder may also contain a filler, or it may be a heat-flowable powder processed in which the particles have been surface-modified.

The heat-flowable fluororesin powder used in this invention has an average porosity of not more than 0.74, preferably in the range of 0.34–0.65. If the porosity exceeds 0.74, the coating formed is prone to cracks, and the surface smoothness of the coating is prone to degradation. In this invention, by the term "porosity" it is meant the volume of the space in a powder layer, expressed by the following formula:

$$\text{Porosity} = 1 - \frac{\text{Apparent Specific Gravity of the Powder}}{\text{True Specific Gravity of the Material Constituting the Powder}}$$

Also, the heat-flowable fluororesin powder of this invention has a total the total surface area of not more than 10 $m^2/cm^3$. The term "total surface area" as used herein refers to the total surface area of the fluororesin powder per unit volume of the resin, and is given in units of $m^2/cm^3$. This value can be derived using the following formula:

Total surface area=(total surface area per gram of the powder)× (specific gravity of the resin)

The total surface area per gram of the powder is measured using the BET method. The heat-flowable fluororesin powder having a total surface area of less than 10 $m^2/cm^3$ which is used in the present invention does not readily fragment when stirred or when sprayed with a spray gun to effect dispersion within the dispersing medium, in addition to which this powder can easily be re-dispersed by stirring when it has separated out and precipitated in the dispersing medium. Hence, a smooth, thick coating can be formed.

Heat-flowable fluororesin powder having a total surface area larger than 10 $m^2/cm^3$ tends to fragment when sprayed with a spray gun, and fragmented powder leads to cracks and uneven films. In addition, because such powder does not readily re-disperse, a fluororesin coating composition of uniform concentration becomes difficult to obtain, making it impossible to form a coating of uniform thickness.

Such a heat-flowable fluororesin powder having an average particle size of 5 to 300 μm, a void fraction of not more than 0.74, and a total surface area of not more than 10 $m^2/cm^3$ can be prepared, as described, for example, in JP-B 53-11296, by spraying the copolymer powder together with a gas flow into a sintering chamber, the environment of which is held at a temperature not lower than the melting point of the copolymer under conditions which do not cause the individual particles fuse with each other. It can also be prepared, as disclosed in JP-A 4-202329 by coagulating colloidal particles, semi-melting the particles and pulverizing them. Thus, the powder used in the liquid dispersion of the present invention can be an agglomeration of smaller particles.

The heat-flowable fluororesin powder is included in an amount of 5 to 50% by volume, based on the dispersion. A resin concentration greater than 50% by volume results in a poor dispersion fluidity, making it difficult to obtain a uniform coat in coating applications such as curtain coating and dip coating. Moreover, a high spraying pressure is required in spray-coating with a spray gun, which is undesirable. On the other hand, when the resin concentration is less than 5% by volume, a thick film cannot be easily formed and the amount of fluororesin paint composition used is so large as to make the drying time excessive, which is economically disadvantageous.

Dispersion Media

The dispersion media used in the present invention have surface tensions of not more than 45 dyne/cm. The use of a multi-component dispersion medium requires the dispersion media to be mutually compatible and the surface tension of the mixed dispersion media to be not more than 45 dyne/cm. When the surface tension of the dispersion media exceed 45 dyne/cm, the powder of this invention may not be sufficiently wetted, resulting in an unstable liquid dispersion. Surface tension is measured at room temperature (20° C).

The dispersion media with surface tensions of less than 45 dyne/cm are preferably a liquid mixture of water with a water-soluble organic liquid. Examples of such water-soluble organic liquids include alcohols such as methanol, ethanol, isopropanol and t-butanol, ketones such as acetone and methyl ethyl ketone (MEK), and mixtures thereof However, a high proportion of water in the liquid mixture is undesirable because it results in a poor film-forming efficiency. Thus, the mixing ratio is determined based on the purpose coating application and the desired film thickness.

Colloidal Particles

The colloidal particles used in this invention have an average particle size of not more than 1 μm, and preferably not more than 0.5 μm. The colloidal particles may be either spherical or fibrous in shape. Preferably they have a fibrous shape in order to increase film formability.

By the term "colloid" is meant a substance that is in a state of division which prevents passage through a semipermeable membrane, consisting of particles too small for resolution with an ordinary light microscope and may have the appearance of a solution, and in suspension or solution fails to settle out and diffracts a beam of light. Colloidal particles suitable for this invention have a small particle size and thus form a colloid in which the water or organic solvent acts as the dispersion medium. This facilitates evaporation of the dispersion medium, drying and curing at temperatures below the melting point of the heat-flowing fluororesin powder. If the colloidal particles are thermally stable (heat resistant) i.e., they do not trigger a dehydration reaction or gasify above the melting point of the heat-flowable fluororesin which would be undesirable because they cause bubbles to form in the coat. Also, high temperatures are undesirable in that they may promote decomposition of the heat-flowable fluororesin powder.

Examples of colloidal particles that may be used include colloidal particles of inorganic oxides such as silicon oxide, aluminum oxide, zinc oxide, tin oxide; and colloidal particles of organic heat resistant resins such as aromatic polyimide (including polyamidoimide), aromatic polyamide, aromatic polyester, polyethylene terephthalate, polyphenylene sulfide, polyether ether ketone, polysulfone, polyetherimide, polyether sulfone. It is preferred that the type of colloidal particles be selected in accord with the demands of the coating application taking into account waterproofing and chemical resistance.

The organic heat resistant resin comprises a polymer which is film-forming upon heating to fusion, is thermally stable, and has a sustained temperature use of at least about 140° C. A heat resistant resin is well known in nonstick finishes for adhering fluoropolymer to substrates and for film-forning and for conferring wear and abrasion resistance. The resin is generally non-fluorine containing and yet adheres to fluoropolymer. Examples of such polymers include one or more: (1) polysulfones, which are amorphous thermoplastic apolymers with a glass transition temperature of about 185° C and a sustained service temperature of about 140° C. to 160° C., (2) polyethersulfones, which are amorphous thermoplastic polymers with a glass transition temperature of about 230° C. and a sustained temperature service of about 170° C. to 190° C., (3) polyphenylene sulfides, which are partially crystalline polymers with a melting temperature of about 280° C. and a sustained temperature service of about 200° C. to 240° C, (4) polyimides and/or polyamideimides, or the polyamide acid precursors thereof (e.g., polyamic acid salt), which crosslink upon heating of the coating to fuse it which have a sustained service temperature in excess of 250° C., Polyaryleneetherketones, such as polyetheretherketone and (5) polyetherketoneketone, which have a sustained use temperature of at least about 250° C.; the amorphous ketone polymers should have a glass transition temperature of at least about 145° C., and the crystalline ketone polymers, a melting temperature of at least about 290° C., among others. All of these polymers are thermally stable and dimensionally stable at temperatures within their sustained service range and below, and they are wear resistant. These polymers also adhere well to clean metal surfaces. Polyimides and/or polyamideimides have been found to especially useful due to their ability to confer excellent abrasion resistance and thermal resistance to the composition.

Prior to baking the liquid dispersion and up until the heat-flowable fluororesin powder particles fuse and form a film, the colloidal particles dispersed within fluororesin powder act as both a crosslinking agent and promote adhesion to the substrate, thus preventing the heat-flowable fluororesin powder from falling off a coated substrate. This enables a thick coat to be formed.

The colloidal particle content is preferably not more than 6.0% by weight, based on the heat-flowable fluororesin powder. Colloidal particles which can inhibit fall-off of the applied coat at the lowest possible content are preferable. A colloidal particle content above 6.0% by weight tends to result in discoloration and bubbling in the applied coat. When this content is excessively high, the coat formability decreases, defects such as pinholes form in the coat, and the coat has a poor strength.

Preferably, the colloidal particles are an organic heat resistant resin having self-coating formation ability. In particular, colloidal particles made of polyether sulfone (referred to as PES hereinafter), which have a high heat resistance and a high chemical resistance, are preferred.

PES colloidal particles

In the preferred term of the invention employing PES colloidal particles, PES colloidal particles having average particle size of not more than 1 μm, and preferably not more than 0.5 μm, are used in this invention. Colloidal particles are preferably added in the form of an aqueous dispersion comprising PES colloidal particles, an organic solvent capable of solubilizing PES, preferably at room temperature i.e., at from 20 to 25° C., and a water-miscible solvent.

Commercially available PES with an average particle size of greater than 1 μm is undesirable. Because the PES colloidal particles employed in accordance with the invention have a small particle size, a colloidal solution can be formed using water or an organic solvent as the dispersion medium. This is preferred because it facilitates evaporation of the dispersion medium, drying, and curing at a temperature below the melting point of the heat-flowable fluororesin powder.

PES is a polymeric compound at least having the repeating units represented by the following formula. Either PES polymers or copolymers can be used.

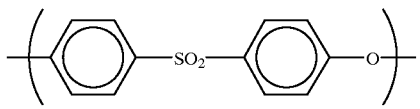

Structure 1

Examples of PES include the following, i.e., polymers having the above-mentioned repeating unit alone ("VICTREX PES" made by ICI, "ULTRASON E" made by BASF); polymers having the following repeating unit ("UDEL" made by Amoco, "ULTRASON S" made by BASF).

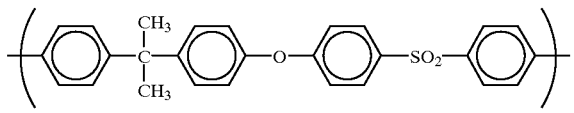

Structure 2

An aqueous dispersion of PES colloidal particles with average particle size of not more than 1 μm is preferably prepared by (1) dissolving PES in an organic solvent capable of solubilizing PES, preferably at room temperature i.e. at from 20 to 25° C.; (2) combining said dissolved PES with a water-miscible solvent which is capable of being dissolved in said organic solvent; and (3) combining water and the dissolved PES and the water-miscible solvent, wherein the water has a surfactant dissolved therein to produce dispersed colloidal particles. The present invention is concerned with a manufacturing method for an aqueous dispersion of polyethersulfone colloidal particles having both good dispersivity and microparticle size.

Preferred organic solvents that dissolve PES are N-methyl-2-pyrrolidone (hereinafter referred to as NMP) or dimethylacetamide (hereinafter referred to as DMA) or a mixture of NMP and DMA. If a solvent is used that disperses the PES rather than solubilizing it, large particle size PES is obtained with poor dispersivity.

The content of PES in the organic solution (preferably NMP or DMA or a mixture) with PES dissolved in it is preferably 20 wt % or less. If the content of PES exceeds 20 wt %, when the water-miscible solvent dissolved in NMP or DMA is added and mixed, the NMP solution or DMA solution with PES dissolved in them or their mixture coagulates, or coagulation takes place when purified water is mixed. Such coagulation is undesirable. Also, the higher the weight of the water-soluble solvent dissolved in NMP or dimethylacetamide, the smaller the average particle size of the PES colloidal particles in the PES aqueous dispersion.

Any water-miscible solvent, that is a solvent for the PES solution, i.e, the water-miscible solvent that can be dissolved in the organic solvent (preferably NMP or DMA or a mixture) may be used as the solvent for adding to the organic solution containing PES. It is preferred that the water-miscible solvent is at least one organic solvent selected from the group consisting of alcohol, glycol, ketone, or ester. Specific examples include ethanol, isopropyl alcohol, tetrahydrofurfuryl alcohol, ethylene glycol, propylene glycol, acetone, methyl acetate, etc. However, they are not exclusive.

When the weight of the aforementioned water-miscible solvent dissolved in organic solvent is increased, there is a tendency for the average particle size of the PES colloidal particles in the PES aqueous dispersion to become smaller.

If an excessively large amount of the water-miscible solvent is added, PES dissolved in the solution will coagulate and be deposited. If an excessively small amount of the water-miscible solvent is added, PES will coagulate and be deposited in the subsequent step in which the solution containing the water-miscible solvent is added to distilled water while stirring. The amount of water-miscible solvent added depends on the type of water-miscible solvent. But, an amount causing neither of the above-mentioned problems is desirable.

When the solution containing PES dissolved in it prepared as explained above is added to purified water containing dissolved surfactant and mixed by stirring, it is possible to obtain a colloidal solution made of the colloidal particles of PES. The preferred surfactants dissolved in the purified water include the anionic and nonionic surfactants that can ensure stable emulsification of the PES aqueous dispersion made of PES colloidal particles. Especially preferred is octyl phenoxypolyethoxyethanol.

The average particle size of PES contained in the aqueous PES dispersion is measured by a grain-size analyzer, resulting in an average particle size of 1 $\mu$m or less. Aqueous PES dispersion made in the present invention contains colloidal particles of PES having a microparticle size. The aqueous PES dispersion can be used alone, or can be combined with other resins such as fluorine resin to obtain a mixed aqueous dispersion and used as a heat-resistant coating material or as a polymer for coating materials.

Fibrous Filler

The fluororesin powder liquid dispersion of the invention includes preferably a fibrous heat-resistant filler having a length of at least 20 $\mu$m and an aspect ratio of at least 2. The fibrous heat resistant filler aids in preventing the heat-flowable fluororesin powder from falling off the coated surface during drying of the coating. A fibrous filler having a length of at least 20 $\mu$m and an aspect ratio of at least 2 is believed to reduce the film drop-off by entanglement with the heat-flowable fluororesin powder of large particle size, and also by alleviating the distortion due to thermal expansion and thermal shrinkage differences between the substrate and the heat-flowable fluororesin powder that arises during film formation. Fibrous filler having a length of less than 20 $\mu$m and an aspect ratio of less than 2 are less effective in preventing film drop-off.

Examples of suitable fibrous fillers such as these having a length of at least 20 $\mu$m and an aspect ratio of at least 2 include inorganic fibers such as glass fibers, carbon fibers, rock wool, ceramic fibers and potassium titanate whiskers, organic fibers such as aramid fibers, and mixtures thereof.

The content of this fibrous filler is less than 65% by volume, based on the total solids, including the heat-flowable fluororesin powder and the fibrous filler. A content of more than 65% by volume results in too many voids, making a uniform film difficult to obtain.

Other Fillers

The fluororesin powder liquid dispersion coating compositions of the present invention may contain fillers other than the above-described fibrous fillers. Examples of such fillers include inorganic materials such as metal powder, metal oxides, glass beads, ceramics, silicon carbide, calcium fluoride, carbon black, graphite, glass flakes and mica and other inorganic substances, PPS (polyphenylene sulfide), PEEK (polyether ether ketone), aramid, "Econol"(a registered trademark of aromatic polyester), and other heat-resistant plastics. These fillers may be added together with the aforementioned fibrous heat-resistant filler. However, they should have a heat resistance of at least 200° C., or preferably 300° C or higher, and they should not promote pyrolysis of the heat-flowable fluororesin. Incorporating 0.05 to 5 % by weight of PPS, based on the heat-flowable fluororesin powder, having an average particle size of not more than 20 $\mu$m is effective in suppressing the bubbling or foaming of coated films in case there is any decomposition of the fluororesin powder.

If the fluororesin powder liquid dispersion is to be applied by spraying, the dispersion preferably has a viscosity of about 8 to 14 seconds, as measured with a Zahn cup No. 4 viscometer (manufactured by Toyo Seiki Company), so as to prevent the liquid from being too thin when sprayed, thereby causing liquid dripping; or from being too concentrated, thereby causing the coating to be uneven.

Fluororesin powder liquid dispersions of this invention may be coated directly on a substrate, or the dispersion of this invention may be applied after first priming the substrate with a primer made of a colloidal solution of PTFE or PFA.

The fluororesin powder liquid dispersion obtained by this invention is suitable for applications aimed at corrosion resistance, nonstickiness, wear resistance, or electrical or conductive uses by selecting the filler types and their amounts or by overcoating with a filler-loaded coating material. Examples of anticorrosion uses include the coating of reaction vessels, agitator blades, baffles and heat-exchange pipes. Examples of wear-preventing uses include the coating of hoppers, chutes, compressor rotors, paper-making rolls, parting molds, and sliding members. Examples of electrical insulating uses include the coating of electrodes.

EXAMPLES

The present invention is illustrated by the following examples. The following is a description of the starting materials, such as resin, dispersion media, and other raw materials as well as coated film formation test procedures, the methods for evaluating the coated film's physical properties and the like.

(1) Starting Materials
  (a) Heat-flowable fluororesin powders

| | |
|---|---|
| PFA powder | Product of Mitsui Du Pont Polyfluorochemical Co., Ltd. (average particle size of 28 $\mu$m, porosity of 0.64, and total surface area of 0.6 m$^2$/cm$^3$) |
| FEP powder | Product of Mitsui Du Pont Polyfluorochemical Co., Ltd. (average particle size of 45 $\mu$m, porosity of 0.47, and total surface area of 0.4 m$^2$/cm$^3$) |
| ETFE powder | Product of Mitsui Du Pont Polyfluorochemical Co., Ltd. (average particle size of 22 $\mu$m, porosity of 0.46, and total surface area of 0.7 m$^2$/cm$^3$) |

The properties of the fluororesin powder were measured using the following methods.

(i) Average particle size:
Micro-Track method: The measurement was carried out using a Micro-Track Particle Size Analyzer Model 7991-01, manufactured by Leeds & Northrup Co.

(ii) Porosity:

$$\text{Porosity} = 1 - \frac{\text{Apparent Specific Gravity of the Powder}}{\text{True Specific Gravity of the Material Constituting the Powder}}$$

(iii) Total surface area:
Total surface area=(Total surface area per gram of the powder)×(Specific gravity of the resin)
The total surface area per gram of the powder was measured using the BET method.

(b) Colloidal Particles
(b-i) Colloidal particles of PES
A solution of NMP containing 5.0 wt % of PES was prepared by dissolving PES ("Polyether sulfone 5003P," product of Sumitomo Chemical Co., Ltd.) in NMP with stirring.

10 g of ethanol were added with stirring to 40 g of the solution to form a transparent solution. Then, the solution was added and stirred for mixing to 37.5 g of purified water with 2.5 g of 10.0 wt % octylphenoxy polyethoxyethanol dissolved in it, forming a milky 2 wt % colloidal solution made of PES colloidal particles. For the PES colloidal particles in the colloidal solution, the average particle size was measured using a particle size analysis meter ("Microtrack" UPA 150 particle size analyzer manufactured by Nikkiso K. K.), and was found to be 0.16 μm.

As noted above, the water miscible solvent used in these examples was ethanol. Colloidal particles suitable particles for the invention have been produced using alternatively 10 g of isopropanol, tetrahydrofurfiiryl alcohol, acetone, or methyl acetate producing PES of particle size 0.16 μm, 0.16 μm, 0.20 μm, 0.18 μm and 0.18 μm respectively. Similarly, 6.0 wt % and 20 wt % PES solutions in NMP and NMP/DMA have been prepared varying the amount of the water miscible solvent ethanol that is added and the amount of surfactant to produce particles in the range of 0.17–0.20 μm.

It has also been observed that when water miscible solvent is not added to the PES solution before the addition of water or water containing surfactant, that the solution coagulated and milky white deposits were obtained instead of the colloidal particles of this invention.

| (b-ii) Other colloidal particles | |
|---|---|
| $SiO_2$ | Snowtex UP manufactured by Nissan Chemical Industry Co., Ltd. (with minor diameter of 5–30 mμm and major diameter of 40–300 mμm) |
| $Al_2O_3$ | Alumina Sol-100 manufactured by Nissan Chemical Industry Co., Ltd. (with minor diameter of 10 mμm and major diameter of 100 mμm) |
| $SiO_2/LiO_2$ | Lithium Silicate 75 ($SiO_2/LiO_2$ molar ratio of 7.5, manufactured by Nissan Chemical Industry Co., Ltd.) |
| (c) Fibrous heat-resistant fillers | |
| Carbon fibers | Carbon Fiber M2007S (with minor diameter of 14.5 μm and major diameter of 100 μm) manufactured by Kureha Chemical Co., Ltd. |
| Glass Fibers | Glass Fiber EPG140 M (with minor diameter of 9.0 μm and major diameter of 140 μm) manufactured by Nippon Denki Glass K.K. |
| (d) Foam Suppressant | |
| PPS | Ryton ® V-1 Crushed Product (average particle size of 14 μm) manufactured by Toso Susteel KK |
| (e) Organic liquid components in dispersion medium | |
| Ethyl alcohol | Boiling point 78.3° C., surface tension 24.0 dyne/cm |
| t-Butyl alcohol | Boiling point 82.5° C., surface tension 22.2 dyne/cm |
| (f) Other fillers | |
| Polytetrafluoroethylene molding powder | 70-J (average particle size of 35 μm) manufactured by Mitsui Du Pont Fluorochemical Co., Ltd. |
| Polyether ether ketone | 150PF/PB134 (average particle size of 35 μm) manufactured by Mitsui Chemical Co., Ltd. |

(2) Coating Formation Test Methods (a) Primer Treatment Coating

A SUS plate measuring 1 mm in thickness, 50 mm in width and 100 mm in length was coated with a liquid dispersion prepared by mixing a PTFE emulsified polymerized dispersion and a PFA emulsified polymerized liquid with resin ratio of PTFE:PFA =3:1 to a thickness of 3–5 μm. A fluororesin powder liquid dispersion was then sprayed to form a layer at a specified thickness. With the coated surface placed at an angle of 450, the coated plate was placed in an oven with forced hot air circulation, dried and sintered using the temperature cycles listed in Table I or Table II to form a film.

(b) Direct Coating

An SUS plate measuring 1 mm in thickness, 50 mm in width and 100 mm in length was sprayed with fluororesin powder liquid dispersion to form a layer at a specified thickness. With the coated surface placed at an angle of 45°, the coated plate was placed in an oven with forced hot air circulation, dried and sintered using the temperature cycles listed in Table I or Table II to form a film.

Temperature Cycles

TABLE I

Temperature Cycles for Examples 1–7

IA

PFA (film thickness of about 600 μm to about 1200 μm)
Heating is performed from 80° C. to 110° C. over 60 min
Heating is performed from 110° C. to 180° C. over 30 min
Heating is performed from 180° C. to 210° C. over 60 min
Heating is performed from 210° C. to 310° C. over 60 min
Heating is performed from 310° C. to 350° C. over 80 min
Sintering is performed at 350° C. for 30 min

IB

ETFE (film thickness of about 600 μm to about 1200 μm)
Heating is performed from 80° C. to 110° C. over 60 min
Heating is performed from 110° C. to 180° C. over 30 min
Heating is performed from 180° C. to 210° C. over 60 min
Heating is performed from 210° C. to 300° C. over 90 min
Sintering is performed at 300° C. for 30 min

TABLE II

Temperature Cycles for Examples 8–16

IIA

PFA and FEP (film thickness of about 300 μm to about 500 μm)
Drying is performed at 110° C. for 40 min, and heating is then performed to 210° C. over 20 min
Drying is performed at 210° C. for 40 min, and heating is then performed to 310° C. over 20 min
Drying is performed at 310° C. for 40 min, and heating is then performed to 340° C. over 20 min
Sintering is performed at 340° C. for 20 min

IIB

ETFE (film thickness of about 300 μm to about 500 μm)
Drying is performed at 110° C. for 40 min, and heating is then performed to 200° C. over 20 min
Drying is performed at 200° C. for 40 min, and heating is then performed to 280° C. over 20 min
Drying is performed at 280° C. for 40 min, and heating is then performed to 310° C. over 20 min
Sintering is performed at 310° C. for 20 min (3) Methods for Evaluating the Properties (a) Film Formation and Fall-Off State:

O: A coating with the desired thickness was formed.

X: The resin powder fell off during drying, so that no coating was formed.

(b) Film Thickness:

Measured using a micrometer.

Examples 1 and 2

Fluororesin powder liquid dispersions were prepared by mixing heat-flowable fluororesin powder PFA, a liquid mixture of ethanol, t-butanol, and ethylene glycol as the liquid dispersion medium having surface tension of 45 dyne/cm or lower, carbon fibers as the fibrous filler, and 2 wt % PPS as the foam suppressant were mixed in the amounts shown in Table HI.

Then, water and 2 wt % PES colloidal solution were added to the obtained mixture to form a fluororesin powder liquid dispersion.

The fluororesin powder liquid dispersion was coated on an SUS plate by the coating method of (2-a), followed by sintering at the temperature cycles listed in Table IA. The properties of the coating were evaluated and the results are listed in Table III.

Example 3

A fluororesin powder liquid dispersion was prepared in the same way as in Example 2, except that glass fibers were used in place of the carbon fibers of Example 2 as the fibrous filler and the amount of the PFA powder was changed to 19.4 g. The composition is listed in Table III.

In the same way as in Example 2, the fluororesin powder liquid dispersion was coated on an SUS plate and was sintered to form a film. The properties of the coating were evaluated, and the results are listed in Table III.

Example 4

A fluororesin powder liquid dispersion was prepared in the same way as in Example 2, except that in addition to the carton fibers used in Example 2, 10 wt % PEEK in the amount listed in Table III was also added and the amount of the PFA powder was changed to 16.4 g.

In the same way as in Example 2, the fluororesin powder liquid dispersion was coated on an SUS plate and was sintered to form a film. The properties of the coating were evaluated, and the results are listed in Table III.

Example 5

A fluororesin powder liquid dispersion was prepared in the same way as in Example 4, except that instead of PEEK used as another filler in Example 4, polytetrafluoroethylene molding powder was used in the amount listed in Table In the same way as in Example 4, the fluororesin powder liquid dispersion was coated on an SUS plate and was sintered to form a film. The properties of the coating were evaluated, and the results are listed in Table III.

Example 6

A fluororesin powder liquid dispersion was prepared in the same way as in Example 4, except that instead of PFA used as the heat-flowable fluororesin powder in Example 2, 18.0 g of ETFE powder were used, and the amount of carbon fibers was changed to 2.0 g.

In the same way as in Example 2, the fluororesin powder liquid dispersion was coated on an SUS plate and was sintered at the temperature cycle listed in Table IB to form a film. The properties of the coating were evaluated, and results are listed in Table III.

Example 7

A fluororesin powder liquid dispersion was prepared in the same way as in Example 6, except that the amount of the 2 wt % PES colloidal solution was changed from that used in Example 6 to 20.0 g.

In the same way as in Example 6, fluororesin powder liquid dispersion was coated on an SUS plate and was sintered to form a film. The properties of the coating were evaluated, and the are results listed in Table III.

Comparative Example 1

A fluororesin powder liquid dispersion was prepared in the same way as in Example 1, except that the PES colloidal solution used in Example 1 was not added.

In the same way as in Example 1, the fluororesin powder liquid dispersion was coated on an SUS plate and was sintered to form a film. The properties of the coating were evaluated, with results listed in Table III.

TABLE III

| | Example 1 | Example 2 | Example 3 | Example 4 | Example 5 | Example 6 | Example 7 | Comparative Example 1 |
|---|---|---|---|---|---|---|---|---|
| Compositions of Dispersions (g) | | | | | | | | |
| PFA | 9.5 | 18.2 | 19.4 | 16.4 | 16.4 | — | — | 9.5 |
| ETFE | — | — | — | — | — | 18.0 | 18.0 | — |
| Ethanol | 3.0 | 6.0 | 6.0 | 6.0 | 6.0 | 6.0 | 6.0 | 3.0 |
| t-Butnaol | 3.0 | 6.0 | 6.0 | 6.0 | 6.0 | 6.0 | 6.0 | 3.0 |
| Ethylene glycol | 2.5 | 5.0 | 5.0 | 5.0 | 6.0 | 5.0 | 5.0 | 2.5 |
| Purified water | 2.5 | 5.0 | 5.0 | 5.0 | 5.0 | 5.0 | — | 2.5 |
| 2% PES solution | 2.5 | 5.0 | 5.0 | 5.0 | 6.0 | 5.0 | 20.0 | — |
| Carbon fibers | 0.5 | 1.8 | — | 1.8 | 1.8 | 2.0 | 2.0 | 0.5 |
| Glass fibers | — | — | 3.0 | — | — | — | — | — |
| Polyether ether | — | — | — | 1.8 | — | — | — | — |
| Polytetrafluoro-ethylene | — | — | — | — | 1.8 | — | — | — |
| PPS | 0.2 | 0.4 | 0.4 | 0.4 | 0.4 | — | — | 0.2 |
| Priming | Yes | Yes | Yes | Yes | Yes | No | No | No |

TABLE III-continued

|  | Example 1 | Example 2 | Example 3 | Example 4 | Example 5 | Example 6 | Example 7 | Comparative Example 1 |
|---|---|---|---|---|---|---|---|---|
|  | | | Properties of Coating | | | | | |
| Film-forming ability | ○ | ○ | ⊙ | ○ | ○ | ○ | ○ | x |
| Film thickness (μm) | 600 | 1200 | 1200 | 1200 | 1200 | 1200 | 1200 | 600 |
| Smoothness | ○ | ○ | ○ | ○ | ○ | ○ | ○ | x |

Examples 8–11

Fluororesin powder liquid dispersions were prepared by mixing heat-flowable fluororesin powder PFA, a liquid mixture of ethanol, t-butanol, and water as the liquid dispersion medium having surface tension of 45 dyne/cm or lower, $SiO_2$ as the colloidal particles, carbon fibers as the fibrous filler, and PPS as the foam suppressant in the amounts shown in Table IV.

The fluororesin powder liquid dispersion was coated on an SUS plate by the coating method of (2-a), followed by sintering at the temperature cycles listed in Table IIA. The properties of the coating were evaluated and the results are listed in Table IV.

Examples 12–14

Fluororesin powder liquid dispersions were prepared by mixing PFA powder as the heat-flowable fluororesin powder, a mixture of ethanol, t-butanol and water as the liquid dispersion medium, $Al_2O_3$ as the colloidal particles, carbon fibers as the fibrous filler, and PPS as the foam suppressant in the amounts listed in Table IV. Using the same coating formation and test methods as those adopted in Application Examples 8–11, coatings were then formed and their properties were evaluated, and the results are listed in Table IV.

Example 15

Fluororesin powder liquid dispersions were prepared in the same way as in Examples 8–11, except that instead of PFA powder used as the heat-flowable fluororesin powder in Examples 8–11, FEP powder was used, and, instead of $SiO_2$ used in 8–10, $SiO_2/LiO_2$ was used. Using the same coating formation and test methods as those adopted in Application Examples 8–11, coatings were then formed and their properties were evaluated, and the results are listed in Table V.

Example 16

Fluororesin powder liquid dispersions were prepared in the same way as in Examples 8–11, except that instead of PFA powder used as the heat-flowable fluororesin powder in Examples 8–11, ETFE powder was used, and the same components in amounts listed in Table V were mixed to form the fluororesin powder liquid dispersions. According to the same coating formation and test methods as those adopted in Examples 8–11, coating was then performed, followed by sintering at the temperature cycles listed in Table IIB to form primer-free coatings. The properties of the coatings were then evaluated and the results are listed in Table V.

Comparative Example 2

A fluororesin powder liquid dispersion was prepared in the same way as in Example 8, in the amounts shown in Table V, with the exception that colloidal particles of $SiO_2$ were not added. Using the same coating formation and test methods as those adopted in Example 8, coating and sintering were carried out. The properties of the coatings were evaluated and the results listed in Table V.

Comparative Example 3

A fluororesin powder liquid dispersion was prepared in the same way as in Example 8 with the exception that colloidal particles of $SiO_2$ and carbon fibers were not added. Using the same coating formation and test methods as those adopted in Example 8, coating and sintering were then carried out. The properties of the coatings were evaluated and the results are listed in Table V.

High quality coatings were formed in Examples 1–7 with the addition of PES colloidal solution and in Examples 8–16 with the addition of inorganic colloidal solution. The coatings were formed without fall-off and separation as shown by the results in Tables III–V. By comparison, without the addition of colloidal particles as shown in Comparative Examples 1–2, although the coating did not fall off, separation took place in about 50% of the coating samples. In Comparative Example 3, in which neither colloidal particles nor fibrous filler were added, the coating fell off without any coating remaining on the substrate.

TABLE IV

|  | Example 8 | Example 9 | Example 10 | Example 11 | Example 12 | Example 13 | Example 14 |
|---|---|---|---|---|---|---|---|
|  | | | Composition of Dispersions (g) | | | | |
| PFA | 7.2 | 7.2 | 7.2 | 7.2 | 7.2 | 7.2 | 7.2 |
| FEP | — | — | — | — | — | — | — |
| ETFE | — | — | — | — | — | — | — |
| Ethanol | 2.25 | 2.25 | 2.25 | 3.00 | 2.25 | 2.25 | 2.25 |
| t-Butnaol | 2.25 | 2.25 | 2.25 | 3.00 | 2.25 | 2.25 | 2.25 |
| Purified | 3.00 | 3.00 | 3.00 | 4.00 | 3.00 | 3.00 | 3.00 |

TABLE IV-continued

|  | Example 8 | Example 9 | Example 10 | Example 11 | Example 12 | Example 13 | Example 14 |
|---|---|---|---|---|---|---|---|
| water |  |  |  |  |  |  |  |
| $SiO_2$ | 0.025 | 0.100 | 0.400 | 0.400 | — | — | — |
| $Al_2O_2$ | — | — | — | — | 0.01 | 0.033 | 0.100 |
| $SiO_2/LiO_2$ | — | — | — | — | — | — | — |
| Carbon fibers | 1.3 | 1.3 | 1.3 | 1.6 | 1.3 | 1.3 | 1.3 |
| Glass fibers | — | — | — | — | — | — | — |
| PPS | 0.15 | 0.15 | 0.15 | 0.20 | 0.15 | 0.15 | 0.15 |
| Priming | Yes | Yes | Yes | Yes | Yes | Yes | Yes |
| Properties of Coating |  |  |  |  |  |  |  |
| Film-forming ability | ○ | ○ | ○ | ○ | ○ | ○ | ○ |
| Film thickness (μm) | 500 | 500 | 500 | 700 | 500 | 500 | 500 |
| Smoothness | ○ | ○ | ○ | ○ | ○ | ○ | ○ |

TABLE V

|  | Example 15 | Example 16 | Comparative Example 2 | Comparative Example 3 |
|---|---|---|---|---|
| Composition of Dispersion (g) |  |  |  |  |
| PFA | — | — | 7.2 | 7.5 |
| FEP | 7.2 | — | — | — |
| ETFE | — | 7.2 | — | — |
| Ethanol | 2.25 | 2.50 | 2.25 | 2.25 |
| t-Butnaol | 2.25 | 2.50 | 2.25 | 2.25 |
| Purified water | 3.00 | 4.00 | 3.00 | 3.00 |
| $SiO_2$ | — | 0.020 | — | — |
| $Al_2O_3$ | — | — | — | — |
| $SiO_2/LiO_2$ | 0.0375 | — | — | — |
| Carbon fibers | 1.3 | — | 1.3 | — |
| Glass fibers | — | 1.3 | — | — |
| PPS | 0.15 | — | 0.15 | 0.15 |
| Priming | Yes | No | No | Yes |
| Properties of Coating |  |  |  |  |
| Film-forming ability | ○ | ○ | X | X |
| Film thickness (μm) | 500 | 550 | — | — |
| Smoothness | ○ | ○ | X | X |

As a result of fluororesin powder liquid dispersion containing colloidal particles of this invention, it is possible to prevent the coatings from falling off substrates during drying and sintering operations, and it is thus possible to form thicker coated films. The aforementioned effect is even more significant when the fluororesin powder liquid dispersion contains fibrous filler having a longest diameter of at least 20 μm and an aspect ratio of at least 2. When this dispersion is applied to a substrate, it is possible to form base materials with good properties, such as corrosion resistance, nontackiness, chemical resistance, abrasion resistance, electrical insulating property, etc., that are useful in chemical plants and in mechanical industries.

What is claimed is:

1. A fluororesin powder liquid dispersion comprising 5–50% by volume based on the liquid dispersion of heat-flowable fluororesin powder having an average particle size of 5–300 μm, a porosity of not greater than 0.74 and a total surface area of not more than 10 $m^2/cm^3$, liquid dispersion medium having a surface tension of not more than 45 dyne/cm, and colloidal particles having an average particle size of not more than 1 μm.

2. The fluororesin powder liquid dispersion of claim 1 wherein the colloidal particles have an average particle size of not more than 0.5μm.

3. The fluororesin powder liquid dispersion of claim 1 wherein the amount of colloidal particles in the dispersion is not more than 6.0% by weight, based on the heat-flowable fluororesin powder.

4. The fluororesin powder liquid dispersion of claim 1 wherein the colloidal particles are selected from a group consisting of colloidal particles of inorganic oxides and organic heat resistant resins.

5. The fluororesin powder liquid dispersion of claim 4 wherein the colloidal particles are selected from a group of organic heat resistant resins consisting of aromatic polyimide, polyaromatic polyamidoimide, aromatic polyamide, aromatic polyester, polyethylene terephthalate, polyphenylene sulfide, polyether ether ketone, polysulfone, polyetherimide, and polyether sulfone.

6. The fluororesin powder liquid dispersion of claim 5 wherein the colloidal particles are polyether sulfone.

7. The fluororesin powder liquid dispersion of claim 4 wherein the colloidal particles are selected from a group of inorganic oxides consisting of silicon oxide, aluminum oxide, zinc oxide and tin oxide.

8. The fluororesin powder liquid dispersion of claim 1 wherein the porosity of the heat-flowable fluororesin powder is in a range from 0.34 to 0.65.

9. The fluororesin powder liquid dispersion of claim 1 further comprising not more than 65% by volume of the total solids, of a fibrous heat-resistant filler having a length of at least 20 μm and an aspect ratio of at least 2.

10. The fluororesin powder liquid dispersion of claim 1 in which the liquid dispersion medium is a mixture of water and a water-soluble organic liquid.

11. The fluororesin powder liquid dispersion of claim 1 further comprising 0.05 to 5% by weight, based on the heat-flowable fluororesin powder, of polyphenylene sulfide having an average particle size of not more than 20 μm.

12. The fluororesin powder liquid dispersion of claim 1 for use in a single film-forming step to form a coating of from 100 to 1000 μm.

13. The fluororesin powder liquid dispersion of claim 1 wherein said fluororesin is a copolymer of tetrafluoroethylene.

14. The fluororesin powder liquid dispersion of claim 13 where said tetrafluoroethylene is copolymerized with perfluoro(alkyl vinyl ether).

15. The fluororesin powder liquid dispersion of claim 13 wherein said tetrafluoroethylene is copolymerized with hexafluoropropylene.

16. The fluororesin powder liquid dispersion composition of claim 13 wherein said tetrafluoroethylene is copolymerized with ethylene.

17. A process for producing an aqueous dispersion of PES colloidal particles comprising:
 (1) dissolving polyether sulfone in an organic solvent capable of solubilizing polyether sulfone;
 (2) combining said dissolved polyether sulfone with a water-miscible solvent which is capable of being dissolved in said organic solvent; and
 (3) combining water and said dissolved polyether sulfone and said water-miscible solvent, wherein said water has a surfactant dissolved therein to produce dispersed colloidal particles.

18. The process of claim 17 wherein said colloidal particles have an average particle size of not more than 1 µm.

19. The process of claim 17 wherein said colloidal particles have an average particle size of not more than 0.5 µm.

20. The process of claim 17 where the organic solvent is selected from a group consisting of N-methyl-2-pyrrolidone or dimethylacetamide or a mixture of N-methyl-2-pyfrolidone and dimethylacetamide.

21. The process of claim 17 where the water-miscible solvent is selected from a group consisting of at least one alcohol, glycol, ketone, and ester.

22. The process of claim 17 where the surfactant is nonionic or anionic.

23. The process of claim 17 wherein the solution formed by dissolving polyether sulfone in step (1) contains not more than 20% by weight polyether sulfone.

24. An aqueous dispersion comprising polyether sulfone colloidal particles, an organic solvent capable of solubilizing polyether sulfone, and a water-miscible solvent.

25. The aqueous dispersion of claim 24 wherein said colloidal particles have an average particle size of not more than 1 µm.

26. The aqueous dispersion of claim 24 wherein said colloidal particles have an average particle size of not more than 0.5 µm.

27. The aqueous dispersion of claim 24 where the organic solvent is selected from a group consisting of N-methyl-2-pyrrolidone or dimethylacetamide or a mixture of N-methyl-2-pyrrolidone and dimethylacetamide.

28. The aqueous dispersion of claim 24 where the water miscible solvent is selected from a group consisting of at least one alcohol, glycol, ketone, and ester.

\* \* \* \* \*